US009285976B2

(12) United States Patent
Matsuki

(10) Patent No.: US 9,285,976 B2
(45) Date of Patent: Mar. 15, 2016

(54) USER INTERFACE DEVICE CAPABLE OF IMAGE SCROLLING NOT ACCOMPANYING FINGER MOVEMENT, IMAGE SCROLLING METHOD, AND PROGRAM

(75) Inventor: Tomoaki Matsuki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 41 days.

(21) Appl. No.: 14/129,740

(22) PCT Filed: Jun. 29, 2012

(86) PCT No.: PCT/JP2012/066719
§ 371 (c)(1),
(2), (4) Date: Dec. 27, 2013

(87) PCT Pub. No.: WO2013/015070
PCT Pub. Date: Jan. 31, 2013

(65) Prior Publication Data
US 2014/0139471 A1 May 22, 2014

(30) Foreign Application Priority Data

Jul. 22, 2011 (JP) ................................. 2011-160406
Mar. 21, 2012 (JP) ................................. 2012-063838

(51) Int. Cl.
G06F 3/0485 (2013.01)
G06F 3/0488 (2013.01)
G06F 3/01 (2006.01)
G06F 3/041 (2006.01)

(52) U.S. Cl.
CPC .............. G06F 3/0485 (2013.01); G06F 3/016 (2013.01); G06F 3/041 (2013.01); G06F 3/04883 (2013.01); G06F 2203/04105 (2013.01)

(58) Field of Classification Search
None
See application file for complete search history.

(56) References Cited

U.S. PATENT DOCUMENTS

2006/0274053 A1* 12/2006 Kinouchi ....................... 345/173
2007/0097093 A1* 5/2007 Ohshita et al. ................. 345/173
2009/0322793 A1 12/2009 Tsuiki
2010/0123686 A1 5/2010 Klinghult et al.

(Continued)

FOREIGN PATENT DOCUMENTS

JP A-2007-10645 1/2007
JP A-2009-265835 11/2009

(Continued)

OTHER PUBLICATIONS

Jan. 28, 2014 International Preliminary Report on Patentability issued in International Patent Application No. PCT/JP2012/066719.
Japanese Office Action issued in Japanese Patent Application No. 2011-160406 on Oct. 2, 2012 (with translation).
International Search Report issued in International Application No. PCT/JP2012/066719 on Sep. 18, 2012 (with translation).
May 22, 2015 Office Action issued in U.S. Appl. No. 14/233,518.

Primary Examiner — David D Davis
(74) Attorney, Agent, or Firm — Oliff PLC

(57) ABSTRACT

A process is disclosed of scrolling an image on a user interface device configured to display the image on a display screen and enable a user to input with the user's finger touch on a touch screen in association with the displayed image, the process including: scrolling the image in response to the finger's drag motion on the touch screen; and, in response to an event occurring in which, after the drag motion ended, the finger is held in touch with the touch screen at substantially the same location as where the finger was located when the drag motion ended, without releasing from the touch screen, further scrolling the image to perform follow-up scrolling, after experiencing an idle period or not.

16 Claims, 7 Drawing Sheets

(56) References Cited

U.S. PATENT DOCUMENTS

2010/0137031 A1 6/2010 Griffin et al.
2011/0050629 A1* 3/2011 Homma et al. ............... 345/174
2012/0056837 A1* 3/2012 Park et al. .................... 345/173

FOREIGN PATENT DOCUMENTS

| JP | A-2010-11137 | 1/2010 |
|----|--------------|--------|
| JP | A-2011-76349 | 4/2011 |
| JP | A-2012-33061 | 2/2012 |

* cited by examiner

USER INTERFACE DEVICE CAPABLE OF IMAGE SCROLLING NOT ACCOMPANYING FINGER MOVEMENT, IMAGE SCROLLING METHOD, AND PROGRAM

TECHNICAL FIELD

The invention relates to techniques directed to user interface devices for displaying an image on a display screen and for allowing a user to perform an input operation or motion through the user's manipulation on a touch screen with the user's finger in association with the displayed image.

BACKGROUND ART

User interface devices have been widespread, which enable a user's input motion or operation by manipulating a display screen with the user's finger, stylus, etc. Notably, in recent years, an increasing number of mobile information devices typified by such as smart phones, tablet computers, electronic books or PDAs (Personal Digital Assistants) have incorporated touch panels serving as a user interface device that receives the user's finger motion as an input signal.

Irrespective of whether a touch panel is incorporated or not, a mobile information device needs to be downsized for a greater mobility. Due to this, in case a mobile information device is equipped with a user interface device in the form of a plurality of physical input keys or buttons, these keys themselves need to be reduced in size, resulting in a risk that the operability of the mobile information device becomes poorer. In contrast, in case a mobile information device is equipped with a user interface device in the form of a touch panel using a plurality of virtual buttons instead of physical buttons, these virtual buttons can be well adjusted in size depending on functions assigned to these buttons, with a greater capability of improving the operability or maneuverability of the mobile information device.

As for a user's input motion through finger touches on a touch panel, one of key factors to improve the operability of the touch panel lies in how the user is required to manipulate the touch panel for moving an integral image displayed on and within a display. Notably, in the case of a mobile information device, a display screen is limited in size, and so there are many case where information or content such as documents or pictures cannot be entirely displayed within the display screen. As a result, the user's action required for moving an image-viewable region or a display window relative to the location of full information or content, to thereby move into view a portion of the full information which has been located out of view (or has been hidden from view or unsighted) is crucial to the user.

Scrolling is known as a manner taken when full information cannot be entirely displayed on a display screen, for moving into view a portion of the full information which has been located out of view. The scrolling is defined as a user's motion of moving an integral image being displayed on and within the display screen, upward, downward, rightward or leftward, as viewed by the user, to thereby move into view a portion of the full information which has been hidden (or assumed to be hidden) from view. In general, in the case of a personal computer, an integral image can be scrolled by a user's action of moving a scroll bar disposed on the periphery of a display screen, upward, downward, rightward or leftward, rolling a wheel of a mouth, or moving the mouth while pressing the wheel.

In addition, in the case of an automotive navigation system, so-called one-touch auto-scrolling technology has been used to automatically scroll a map such that a location on the map which is beneath a user's finger touch point on a display screen, moves to the center point of the display screen. For this one-touch auto-scrolling technology, a technique has been proposed of zooming out an image on the screen while being scrolled in the above-described manner, when a time distance between adjacent touches is equal to or smaller than a threshold (see Patent Document No. 1). This technique enables locations on the map which have been located far away from an image being displayed on screen, to be scrolled to the center point of the display screen. Additionally, a technique is also known for reducing a user's chances of performing incorrect input actions when the user performs a scroll action after a stationary touch on a touch panel, and when the user performs an instant touch on the touch panel for a very short length of time (see Patent Document No. 2).

On the other hand, many mobile information devices allow a user to scroll an integral image as a result of a so-called drag motion in which the user moves a finger while holding the finger in contact with a touch panel. In addition, a technique has been also proposed of detecting a tilt angle of a mobile information device, and then, for a period during which the user continues a particular form of a touch action, scrolling a displayed image at a varying scroll rate depending on the amount of the detected tilt angle (see Patent Document No. 3).

PRIOR-ART REFERENCES

Patent Documents

Patent Document No. 1: Japanese Patent Application Publication No. 2009-265835
Patent Document No. 2: Japanese Patent Application Publication No. 2007-010645
Patent Document No. 3: Japanese Patent Application Publication No. 2011-076349

SUMMARY OF THE INVENTION

Problem(s) that the Invention Attempts to Solve

Those conventional mobile information devices, however, require a user who attempts to scroll full information as a result of the user's drag motion using a finger when the full information cannot be entirely displayed within a display screen, to repeat drag motions for causing the display screen to display a region of the full information which has not been displayed and has been located at a distant location from the display screen.

In this regard, the "distant" location refers to one of locations on information space (assuming that full information is displayed on a virtual display screen having an infinite size, every point on the full information is assigned to any one of points on the information space), which is distant from the real display screen. In an example, the width of content in the form of a picture is far larger than the width of the real display screen. In this example, a region of the content which is not displayed on the real display screen becomes more "distant" from the real display screen, as the region becomes closer to one of the opposite edges of the information space that is assigned to the same content, wherein the edges are widthwise spaced apart from each other.

Actually, in case a movement of an integral image needs to be invoked by a single drag-motion using a user's finger, the moving distance of the integral image is determined by the moving distance of the user's finger, that is, a distance between two locations within a screen. As a result, the user is required to perform more drag motions, as a region of full information that needs to be displayed becomes more "distant" from the screen.

The prior art such as disclosed in Patent Document Nos. 1-3 would not easily overcome those drawbacks. For example, a one-touch auto-scrolling technique such as disclosed in Patent Document Nos. 1 and 2 would merely allow a portion of a displayed image which is beneath a finger contact point to be moved to the center of a display screen, and would still limit the maximum distance of the movement of an integral image basically invoked by a single user motion. In addition, that technique would not make it easier to adjust a scroll rate for easier search for a desired portion within an out-of-view region of full information.

Additionally, the technique of Patent Document No. 1 allows an integral image to be scrolled, while being zoomed out, so that a larger region of full information can be displayed. This technique helps in scrolling map information, but suffers in scrolling full information in the form of texts and pictures on a mobile information device, because, for example, in case a search is performed for a desired portion within an out-of-view region of the full information, letters becomes too small to be easily viewed.

In addition, like Patent Document No. 3, there is a technique that requires a user who attempts to scroll an image at a variable scroll rate, to tilt a mobile information device while touching a screen in the particular manner, to thereby determine the actual scroll rate depending on the actual angle of the tilt, and this technique is advantageous in that it enables adjustment of a scroll rate, but is disadvantageous in that the required motion is not easy for the user. In addition, the user is forced to view an image being scrolled through on the tilted screen, causing the user's inconvenience in searching for a desired portion within an out-of-view region of full information.

Then, the object of the present invention is to provide a user interface device, a method for image scrolling, and the associated computer program, each of which allows a user to move into view in a shortened period of time an out-of-view and distant-from-screen region of full information too large to be entirely displayed on a screen, as a result of the user's simplified motion.

Means or Steps for Solving the Problem(s)

The following modes are provided by the invention. These modes will be stated below such that these modes are divided into sections and are numbered, such that these modes depend upon other mode(s), where appropriate, and such that each mode in such a dependent form permits each technical feature set forth in each mode to be independent or separate according to the nature of the corresponding technical feature, where appropriate.

(1) A user interface device operable to perform a display function of displaying an image, a touch panel function of outputting successive locations of the user's finger contact point on a touch screen over time, and a function of scrolling an integral image being displayed, in response to a drag motion performed on the touch screen with the user's finger, the user interface device comprising:

a pressing-force sensor detecting a pressing force with which the finger presses the touch screen;

a motion-recognizing unit configured to determine whether or not the drag motion has ended;

a scroll-rate determining unit configured to be operable in response to the motion-recognizing unit determining that the drag motion has ended, to determine a post-drag scroll rate that is a scroll rate of scrolling to be performed subsequently to the drag motion, based on a magnitude of the pressing force detected by the pressing-force sensor at an end time of the drag motion and/or during a period of time after the end time of the drag motion; and a scroll controller configured to further scroll the integral image being displayed, at the determined post-drag scroll rate, after scrolling invoked by the drag motion ends.

(2) The user interface device according to mode (1), wherein the scroll controller is configured to be operable in response to the user pressing the finger onto the touch screen just after the drag motion, to raise a scroll rate of the scrolling to be performed by the scroll controller up to the determined post-drag scroll rate.

(3) The user interface device according to mode (1) or (2), further comprising:

a haptic feedback arrangement configured to impart haptic feedback to the user's finger in contact with the touch screen; and a haptic feedback controller configured to control the haptic feedback arrangement to impart to the finger via the touch screen, the haptic feedback with an intensity changing as a function of a scroll rate of the scrolling to be performed by the scroll controller.

(4) The user interface device according to mode (3), wherein the haptic feedback controller is configured to control the haptic feedback arrangement to impart to the finger vibrations with intensities that become higher as the scroll rate of the scrolling becomes higher.

(5) The user interface device according to any one of modes (1) though (4), wherein the motion-recognizing unit is configured to be operable in response to the motion-recognizing unit determining that the drag motion has ended, to determine whether or not the finger is in touch with the touch screen, and the scroll controller is configured to be operable in response to the motion-recognizing unit determining that the finger is in touch with the touch screen, to further scroll the integral image at the determined post-drag scroll rate.

(6) The user interface device according to any one of modes (1) through (5), the scroll-rate determining unit is configured to determine the post-drag scroll rate to be zero, when the pressing force is below a predetermined threshold.

(7) The user interface device according to any one of modes (1) through (6), wherein the scroll controller is configured to retain information indicative of a direction of scrolling that was invoked by the drag motion, and further scroll the integral image in a same direction as that of the scrolling invoked by the drag motion, subsequently to the drag motion.

(8) The user interface device according to any one of modes (1) through (7), wherein the scroll-rate determining unit is configured to detect successive values of the pressing force via the pressing-force sensor, during the period of time subsequent to the end time of the drag motion and optionally at the end time of the drag motion, and determine the post-drag scroll rate at each point in time, based on a maximum value among the detected values of the pressing force obtained until each point in time.

(9) The user interface device according to mode (8), wherein the motion-recognizing unit is configured to successively determine whether or not the finger is in touch with the touch screen after the drag motion ends, and the scroll-rate determining unit is configured to determine the post-drag scroll rate to be zero regardless of the maximum value of the pressing force, when the motion-recognizing unit determines that the finger is not in touch with the touch screen.

(10) The user interface device according to mode (8) or (9), wherein the scroll-rate determining unit is configured to be operable in response to an event occurring in which the pressing force changes over time such that the pressing force increases to a first value just after the drag motion ends, and then the pressing force decreases to a second value, to control the scroll rate of the scrolling to exhibit a characteristic that the scroll rate increases to a value of the post-drag scroll rate which is determined depending on the first value, and then the scroll rate is kept unchanged.

(11) A method of scrolling an image on a user interface device operable to perform a display function of displaying an image, a touch panel function of outputting successive locations of the user's finger contact point on a touch screen over time, and a function of scrolling an integral image being displayed, in response to a drag motion performed on the touch screen with the user's finger, wherein the user interface device comprises a pressing-force sensor detecting a pressing force with which the finger presses the touch screen, the method comprising:

a first step of determining whether or not the drag motion has ended;

a second step of determining, in response to the motion-recognizing unit determining that the drag motion has ended, a post-drag scroll rate that is a scroll rate of scrolling to be performed subsequently to the drag motion, based on a magnitude of the pressing force detected by the pressing-force sensor at an end time of the drag motion and/or during a period of time subsequent to the end time of the drag motion; and a third step of further scrolling the integral image being displayed, at the determined post-drag scroll rate, after scrolling invoked by the drag motion ends.

(12) The method according to mode (11), wherein the second step is implemented to detect successive values of the pressing force via the pressing-force sensor, during the period subsequent to the end time of the drag motion and optionally at the end time of the drag motion, and determine the post-drag scroll rate at each point in time, based on a maximum value among the detected values of the pressing force obtained until each point in time.

(13) A process of scrolling an image on a user interface device configured to display the image on a display screen and enable a user to input with the user's finger touch on a touch screen in association with the displayed image, the process comprising:

a first step of scrolling the image in response to the finger's drag motion on the touch screen; and a second step of further scrolling, in response to an event occurring in which, after the drag motion ended, the finger is held in touch with the touch screen at substantially the same location as where the finger was located when the drag motion ended, without releasing from the touch screen, the image to perform follow-up scrolling, after experiencing an idle period or not.

(14) The process according to mode (13), wherein the second step is implemented to control a scroll rate of the follow-up scrolling, depending on an intensity of the finger's touch on the touch screen, such that the scroll rate increases continuously or stepwise, as the intensity of the finger's touch increases.

(15) The process according to mode (14), wherein the second step is implemented to control the scroll rate of the follow-up scrolling, such that the scroll rate does not decrease even when the intensity of the finger's touch decreases.

(16) A program to be executed by a computer to perform the method according to any one of modes (11) through (15).

Advantageous Effects of the Invention

A user interface device according to the present invention allows a user to move into view in a shortened period of time an out-of-view and distant-from-screen region of full information too large to be, entirely displayed on a screen, as a result of the user's simplified motion, and the same holds true for a method of image scrolling and the associated program, each of which is according to the present invention.

BRIEF DESCRIPTION OF THE DRAWINGS

FIGS. 1(A), 1(B) and 1(C1) are front views illustrating a mobile information device 1 incorporating a user interface device according to a first illustrative embodiment of the invention, together with a series of a user's finger motions occurring during a drag click motion, and FIG. 1(C2) is a side view illustrating a finger-press motion occurring during the drag click motion.

MODES FOR CARRYING OUT THE INVENTION

Illustrative embodiments of the invention will be described below with reference to the drawings.

First, generally describing, user interface devices constructed according to the invention are featured in that, in response to a user's drag motion, an integral entire image on a display starts scrolled in a direction and by a distance, each of which is determined depending on the status of the drag motion, and then, the integral image is further scrolled at a variable rate or velocity determined depending on the magnitude of a pressing force with which the user presses a touch panel with the user's finger (i.e., an example index of the intensity of a finger touch on a touch panel).

For the sake of simplicity, a combined motion of a preceding drag motion (for invoking preceding scrolling), and a subsequent finger-press motion imparted to a touch panel (which triggers subsequent scrolling following the preceding scrolling) will be referred to as "drag click motion" below.

In this regard, the term "integral image" refers to a portion of full information which is to be scrolled, whether the full information is displayed on a display screen partially or entirely. In case the full information is entirely covered by the display screen, the entirety of the full information is to be scrolled. In contrast, in case the full information is not entirely covered by the display screen, a region of the full information which is displayed on the display screen is to be scrolled.

It is noted that user interface devices to which the invention is directed allow a user to enter information through the user's finger touches on a touch panel. This allows each of most of those user interface devices to be incorporated in a mobile information device that can be held by a user with the hand(s) for manipulation, such as a smart phone or a tablet computer. Under these circumstances, illustrative embodiments of the invention will be described below by taking examples of user interface devices in which the invention is embodied and which are built in mobile information devices.

Figure 1:
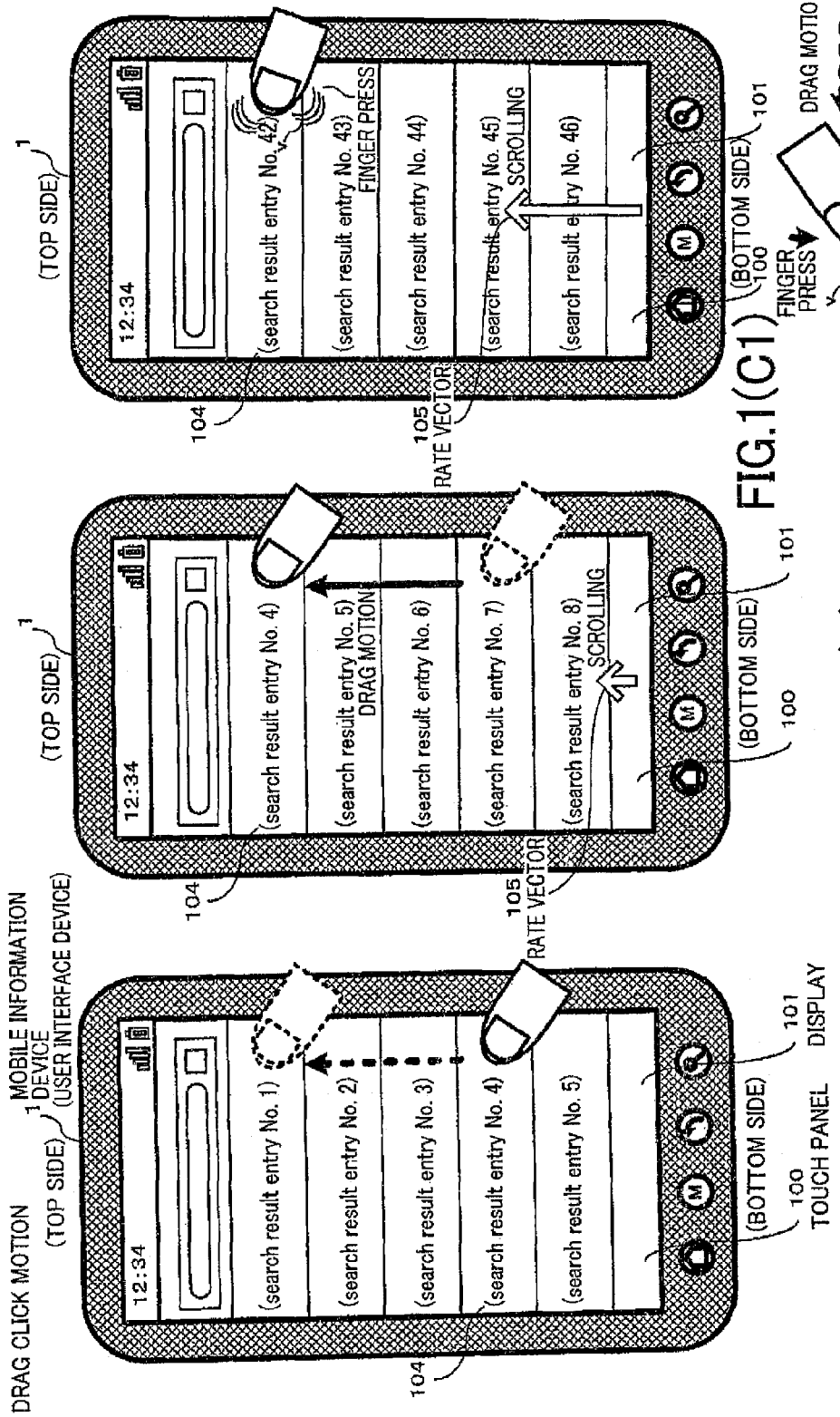

FIG. 1 is front views illustrating a mobile information device 1 incorporating a user interface device according to a first illustrative embodiment of the invention, together with a series of a user's finger motions occurring during the drag click motion.

It is noted that, for easy understanding, an example scenario will be taken below in which, in response to a user's entry of a condition, a search is performed under the condition using a search engine, an image (e.g., a textual document) containing a plurality of search result entries indicative of a plurality of results of the search is displayed on a display screen, and the image is scrolled depending on the user's finger motion, but it is of course that the invention may be also applied to a scrolling experience of other images indicative of other sets of information.

FIGS. 1(A), 1(B) and 1(C1) are front views illustrating the mobile information device 1, together with a series of a user's finger motions occurring during the drag click motion. And FIG. 1(C2) is a side view illustrating a finger-press motion occurring during the drag click motion.

In an example depicted in FIG. 1, at first, the image indicative of the plurality of search results is displayed on the screen of a display 101 as illustrated in FIG. 1(A). In this implementation, only first through fifth search result entries 104 of fifty search result entries 104 are displayed on the screen.

In the example depicted in FIG. 1(A), the user touches the finger down to a touch panel 100, and immediately slides the finger upward with the finger kept in contact with the touch screen 100. That is, a so-called drag motion is performed. As illustrated in FIG. 1(B), this motion invokes upward scrolling of the image containing the plurality of search result entries 104 in coordination with the finger's movement. As a result, for example, fourth through eighth search result entries 104 of all the search result entries 104 are displayed.

Immediately after stopping that drag motion, the user presses the finger on the touch panel 100 at the same position at which the finger had touched the screen when the drag motion was stopped. A simplified series of motions comprised of the drag motion and the subsequent finger-press motion qualifies as a drag click motion. As a result of this drag click motion, as illustrated in FIG. 1 (C1), subsequently to scrolling invoked by the drag motion, the image containing the search result entries 104 is further scrolled at a higher scroll rate than before, which depends on the status of the finger-press motion.

In that phase, the user can adjust the scroll rate by increasing or decreasing the intensity of the finger-press motion during scrolling. As a result, for example, forty-second through forty-sixth search result entries 104, which are ones of all the search result entries 104 which have not been displayed and have been located distant from the screen, will move towards the screen and come into view in a shortened period of time. Thereafter, for example, the user can find and select forty-fifth search result entry 104 as the user's optimum search result entry (i.e., a desirable one or more of the plurality of search result entries 104), and then can execute the forty-fifth search result entry 104.

It is noted that the distance by which an image is moved (i.e., scrolled) as a result of a drag motion may be equal to the finger's moving distance, or may be equal to a suitable value varying as a function of the finger's moving distance, for example, a multiple of the finger's moving distance or a fixed number of times the finger's moving distance. In addition, it is of course that the direction in which the finger has to be moved is not limited to an upward direction. For example, the finger can be moved on the surface of the touch panel 100 in any direction, and then a displayed image can be moved in a selected one of upward, downward, leftward, rightward directions and optionally an oblique direction, so as to reflect the direction in which the finger moved.

It is also noted that a scroll direction taken after a drag motion ends is preferably equal to a scroll direction taken during the drag motion. This allows the user to experience continued scrolling in the same scroll direction as a scroll direction designated by the user through the drag motion. For achieving this, a scroll controller 123 (see FIG. 5) described below is preferably configured to receive from a motion-recognizing unit 121 (see FIG. 5) information of a scroll direction taken during the drag motion and retail the information. After the drag motion ends, the scroll controller 123 further scrolls an integral image in the same direction as that taken during the drag motion.

Thus, in the present embodiment, the drag click motion allows a region of full information which has not been displayed on the screen and has been located far away from the screen to come into view in a shortened period of time, without relying on many drag motions. Further, the user can freely adjust a scroll rate during the scrolling, which allows the user to view and check many regions of full information which have not been displayed on the screen, at the user's desirable pace, without spending such a long time.

As illustrated in FIG. 1 (C2), a finger-press motion occurring after a drag motion creates a pressing force $p_C$ applying to the touch panel 100. Depending on the magnitude of the pressing force $p_C$, a scroll-rate determining unit 122 (see FIG. 5) described below determines a scroll rate of scrolling to be invoked after the drag motion ends. Hereinafter, this rate will be referred to as "post-drag scroll rate," in a sense that this is one of scroll rates which is to be achieved after a drag motion ends.

It is noted that that post-drag scroll rate refers to a target value of a scroll rate in a sense of the system design. In a virtual system where no delay in response is considered, there is a match between an actual value of each of instantaneous scroll rates (see the lower graph in FIG. 3) occurring during scrolling after a drag motion ends, and a target value of one of the instantaneous scroll rates which occurs at the same time that its corresponding actual value occurs, but actually, there is no match therebetween because of a delay in response.

However, for the sake of simplicity, the term "post-drag scroll rate" will be used as a word substantially equivalent to an actual value of a scroll rate during scrolling after a drag motion ends.

In addition, a haptic feedback arrangement 102 (see FIG. 4) described below can impart to the user's finger, haptic feedback changing in intensity to the scroll rate. For example, as the user conducts a finger-press motion more strongly, the post-drag scroll rate (i.e., a target value of the scroll rate) is determined to have a greater value, and as a result, as the scroll rate becomes higher, the finger is imparted vibrations v at an increasing intensity level. This allows the user to feel how high a scroll rate is through the intensity level of vibrations imparted to the finger, providing the user with realistic feel when the user operates the device.

In addition, it is preferable that, during a period of scrolling invoked by a finger-press motion, optionally along with a period of scrolling invoked by a drag motion, a rate-vector arrow 105 indicative of a rate vector representative of a time-varying scroll rate occurring during the corresponding scrolling(s) is displayed on the screen in real time. The rate-vector arrow 105 is defined as, for example, an arrow having a length changing proportional to a scroll rate, and having the same direction as that of the scrolling. The user can adjust the status of a finger-press motion by checking the status of the ongoing scrolling while viewing the rate-vector arrow 105.

Figure 2:
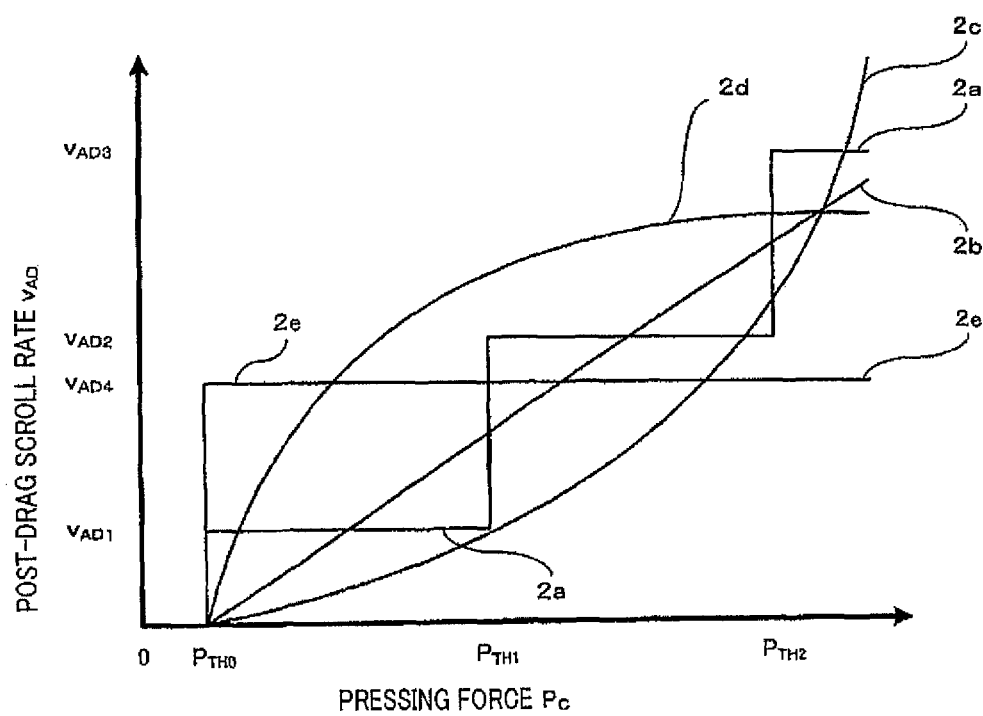
FIG. 2 is a graph showing variations of the correspondence between a pressing force $p_C$ applied by a user's finger and a post-drag scroll rate $v_{AD}$, wherein the variations are acceptable to the mobile information device depicted in FIG. 1.

FIG. 2 is a graph indicating a plurality of illustrative possible variations of a post-drag scroll rate $v_{AD}$ (=$f(p_C)$) that is the function $f(p_C)$ of a pressing force $p_C$. The function $f(p_C)$ defines the correspondence between the pressing force $p_C$ and the post-drag scroll rate $v_{AD}$.

In FIG. 2, five different relationships 2a, 2b, 2c, 2d and 2e are illustrated each of which defines the corresponding relationship between the pressing force $p_C$ and the post-drag scroll rate $v_{AD}$.

According to the relationship 2a, the post-drag scroll rate $v_{AD}$ is set to $v_{AD1}$ within a range of the finger's pressing force $p_C$ which is defined by $p_{TH0} \leq p_C < p_{TH1}$, to $v_{AD2}$ (>$v_{AD1}$) within a range of the pressing force $p_C$ which is defined by $p_{TH1} \leq p_C < p_{TH2}$, and to $v_{AD3}$ (>$v_{AD2}$) within a range of the pressing force $p_C$ which is defined by $p_{TH2} \leq p_C$. In case this relationship 2a is accepted to define the function $f(p_C)$, the scroll rate after a drag motion ends increases in steps, as the finger is pressed with a larger force.

In addition, according to the relationship 2b, the post-drag scroll rate $v_{AD}$ is directly proportional to the pressing force $p_C$, and so is set to a continuously increasing value as the pressing force $p_C$ increases. In case this relationship 2b is accepted to define the function $f(p_C)$, the scroll rate after a drag motion ends increases proportionally, as the finger is pressed with a larger force.

Additionally, according to the relationship 2c, the post-drag scroll rate $v_{AD}$ is not so high when the pressing force $p_C$ is smaller, while the post-drag scroll rate $v_{AD}$ exponentially increases with the pressing force $p_C$ when the pressing force $p_C$ is larger. According to the relationship 2c, the slope of the graph that indicates the relationship 2c increases with the pressing force $p_C$. In case this relationship 2c is accepted to define the function $f(p_C)$, the scroll rate after a drag motion ends gently increases for a while just after the finger starts being pressed, but thereafter, the post-drag scroll rate $v_{AD}$ exponentially increases, as the finger is pressed with a larger force.

In addition, according to the relationship 2d, the post-drag scroll, rate $v_{AD}$ rapidly increases as the pressing force $p_C$ initially increases, and thereafter, the post-drag scroll rate $v_{AD}$ almost keeps at a converged value despite any further increase in the pressing force $p_C$. According to the relationship 2d, the slope of the graph that indicates the relationship 2d decreases with the pressing force $p_C$. In case this relationship 2d is accepted to define the function $f(p_C)$ the scroll rate after a drag motion ends rapidly increases just after the finger starts being pressed, but after the finger pressing-force reaches a certain value, the post-drag scroll rate $v_{AD}$ almost keeps at a constant value.

Additionally, according to the relationship 2e, the post-drag scroll rate $v_{AD}$ is set to a constant value ($v_{AD4}$) irrespective of how large the pressing force $p_C$ is when the finger's pressing force $p_C$ is equal to or larger than $p_{TH0}$ (i.e., $p_C \geq p_{TH0}$ is met). In case this relationship 2e is accepted to define the function $f(p_C)$, scrolling is performed after a drag motion ends at a fixed scroll rate ($v_{AD4}$) as long as the finger is pressed with a force equal to or larger than a certain value.

It is noted that alternative profiles or characteristics of the relationship between the pressing force and the scroll rate are acceptable. However, in any one of those alternative profiles, it is preferable that the post-drag scroll rate $v_{AD}$ is defined as a function of the pressing force $p_C$ which indicates that the post-drag scroll rate $v_{AD}$ monotonously increases as the pressing force $p_C$ increases, like the cases of the relationships 2b, 2c and 2d, or a function of the pressing force $p_C$ which indicates that the post-drag scroll rate $v_{AD}$ does not decrease as the pressing force $p_C$ increases, like the cases of the relationships 2a and 2e as well as the relationships 2b, 2c and 2d. In other words, profiles or characteristics of the function are preferably defined to indicate that there is no chance of the post-drag scroll rate $v_{AD}$ dropping as the pressing force $p_C$ increases. These settings allow the user to keep the same feeling that, basically, the stronger a finger press is, the higher a scroll rate.

In addition, any one of the above-described relationships is defined to indicate that the post-drag scroll rate $v_{AD}$ is set to zero when the pressing force $p_C$ is smaller than the threshold $p_{TH0}$. In this regard, the threshold $p_{TH0}$ is generally set to a value larger than a pressing-force which the user is expected to apply to the touch panel 100 while the user is performing a drag motion with the finger.

This allows an integral image to restart scrolling after a drag motion ends, that is, after the user starts holding the finger anywhere on the touch panel 100, whether or not a non-scroll period occurs before the scrolling restarts, only if the drag motion is followed by the user's finger-pressing motion with an pressing force $p_C$ equal to or larger than the threshold $p_{TH0}$.

In other words, a variable range of the pressing force $p_C$ has an ineffective or idle area located equal to or lower than the threshold $p_{TH0}$, in which the post-drag scroll, rate $v_{AD}$ is kept zero irrespective of any increase in the pressing force $p_C$, and it is not until the pressing force $p_C$ becomes equal to or larger than the threshold $p_{TH0}$ that the post-drag scroll rate $v_{AD}$ becomes non-zero, creating an effective or active area of a drag click motion. It is noted that the threshold $p_{TH0}$ may be set to, for example, any value between 0.5N and 2.0N.

Further, in alternative implementations, the graphs in FIG. 2 may be replaced with a different graph that indicates the relationship between the pressing force $p_C$ and the post-drag scroll rate $v_{AD}$, such that the graph does not have the above-mentioned ineffective area defined by the threshold $p_{TH0}$, and the graph passes though the origin (i.e., the pressing force $p_C$=0), to thereby allow scrolling to start in response to even a little bit increase of the pressing force $p_C$ from zero. In these implementations, even after a drag motion ends, an integral image continues scrolling at the post-drag scroll rate $v_{AD}$ depending on the pressing force $p_C$, without requiring the user to apply any additional pressing force, as long as the finger is held in touch with the touch panel 100 with such a small force as to generate a small pressing force $p_C$.

Figure 3:
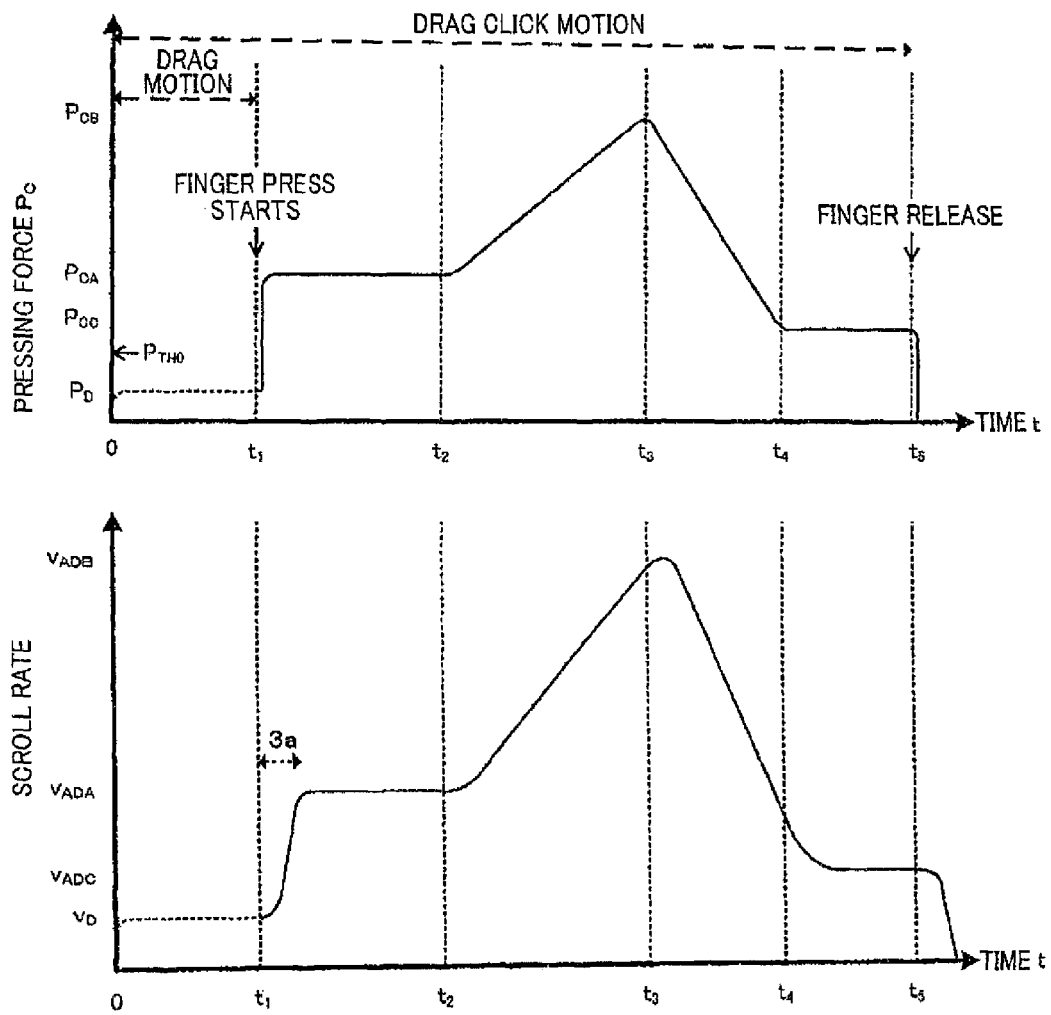
FIG. 3 illustrates a graph showing an example of a time history of the pressing force $p_C$ applied by the user's finger during the drag click motion, on the mobile information device depicted in FIG. 1, and a graph showing an example of a time history of a scroll rate changing as a function of the pressing force $p_C$.

FIG. 3 illustrates a graph showing an example of a time history of a pressing force $p_C$ applied by the user's finger during a drag click motion, and a graph showing an example of a time history of a scroll rate changing as a function of the pressing force $p_C$. It is noted that these graphs indicate that the pressing-force time history and the scroll rate time history are not completely in sync with each other, showing the existence of a delay in response therebetween.

In an example depicted in FIG. 3, it was assumed that the pressing force $p_C$ and the post-drag scroll rate $v_{AD}$ were correlated according to the relationship 2b (direct proportional) depicted in FIG. 2. The same results provided by the example of FIG. 3, however, can be provided by accepting the relationship 2a of FIG. 2 instead of the relationship 2b, and modifying the relationship 2a such that a graph of the modified relationship 2a has adequately many more steps (making the threshold $p_{TH}$ to have more values), to thereby reduce an interval between adjacent ones of values of the post-drag scroll rate $v_{AD}$ (i.e., a rate step or a rate increment) to an adequately small value.

In the example depicted in FIG. 3, a drag motion was performed during a period from t=0 to t=$t_1$. A scroll rate (i.e., an actual scroll rate) during that period reflected the finger's moving velocity, which was $v_D$. Thereafter, a finger press onto the touch panel 100 started at the same time that the drag motion ended (i.e., t=$t_1$), resulting in the pressing force $p_C$ increasing from $p_C$ to $p_{CA}$ through the threshold $p_{TH0}$. As the pressing force $p_C$ increased, the scroll rate increased from $v_D$ to a post-drag scroll rate $v_{ADA}$ (>$v_D$).

In this regard, the length of an acceleration period 3a allowing the scroll rate to raise from $v_D$ to a target value $v_{ADA}$ determined how fast a scroll motion responded to the user's motion speed during the drag click motion. For this reason, it is preferable that the length of the acceleration period 3a is user-adjustable to allow the user to feel good in manipulating the touch panel 100. In addition, the pressing force $p_{CA}$ was set to a value that is equal to or larger than the threshold $p_{TH0}$ (see FIG. 2) (i.e., $p_{CA}>=p_{TH0}$), and the value is suitable for invoking scrolling after a drag motion ends.

It is noted that, in case there is a temporal gap between the end time of a drag motion and the start time of a finger-press motion, the pressing force $p_C$ is smaller than the threshold $p_{TH0}$ during that temporal gap, resulting in the fact that scrolling, which is invoked by the drag motion, temporarily stops, which is followed by a non-scroll period, and thereafter, the scrolling, which is invoked by the user's finger press, resumes.

Subsequently, the pressing force $p_C$ was kept unchanged until t=$t_2$, which was followed by the user's additional finger-press motion with a greater force than before, in an attempt to move into view a region of full information that was being focused on, wherein the region was still located distant from the screen and was still out of view even after the scrolling (i.e., preceding scrolling and subsequent scrolling) was performed. As a result, the finger's pressing force $p_C$ kept increasing during a period from t=$t_2$ to t=$t_3$, resulting in a transition from $p_{CA}$ to $p_{CB}$ (>$p_{CA}$).

Consecutive values of the post-drag scroll rate $v_{AD}$ (i.e., actual values of a scroll rate) were determined successively over time during that transition, and these values were also increased one after another on a time line, resulting in an increase from $v_{ADA}$ to $v_{ADB}$ (>$v_{ADA}$). As a result, the scroll rate was held at the post-drag scroll rate $v_{ADA}$ at least until t=$t_2$, subsequently increased, and after t=$t_3$, reached the post-drag scroll rate $v_{ADB}$.

Thereafter, the user recognized that, owing to the past scrolling, a region of the full information which was being displayed on the screen was getting closer to a target region of the full information, and subsequently, the user continued the finger-press motion with a gradually decreasing magnitude of a pressing force, resulting in the pressing force $p_C$ dropping to $p_{CC}$ at t=$t_4$. As the pressing force $p_C$ dropped, the post-drag scroll rate $v_{AD}$ also dropped over time, and after t=$t_4$, the scroll rate dropped to a post-drag scroll rate $v_{ADC}$.

Thereafter, the user found the target region within the screen in a state of $p_C$=$p_{CC}$, and subsequently, the user released the finger from the touch panel 100 at t=$t_5$. In response, the scroll rate was also kept at the post-drag scroll rate $v_{ADC}$ at least until t=$t_5$, and eventually became zero (the scrolling was completed).

As will be evident from the foregoing explanation, according to the present embodiment, the user's simplified drag click motion, which includes a finger-press motion occurring subsequently to a drag motion, and a motion for adjustment of a pressing force $p_C$ with which the finger presses the touch panel 100, allows controlling of a scroll rate, and therefore, controlling of a scroll distance. As a result, the user can move into view an out-of-view region of full information in a shortened length of time, and the user can invoke scrolling subsequently to a drag motion, without moving the finger on the touch panel 100, which provides the user with improved ease of use of the mobile information device 1.

Figure 4:
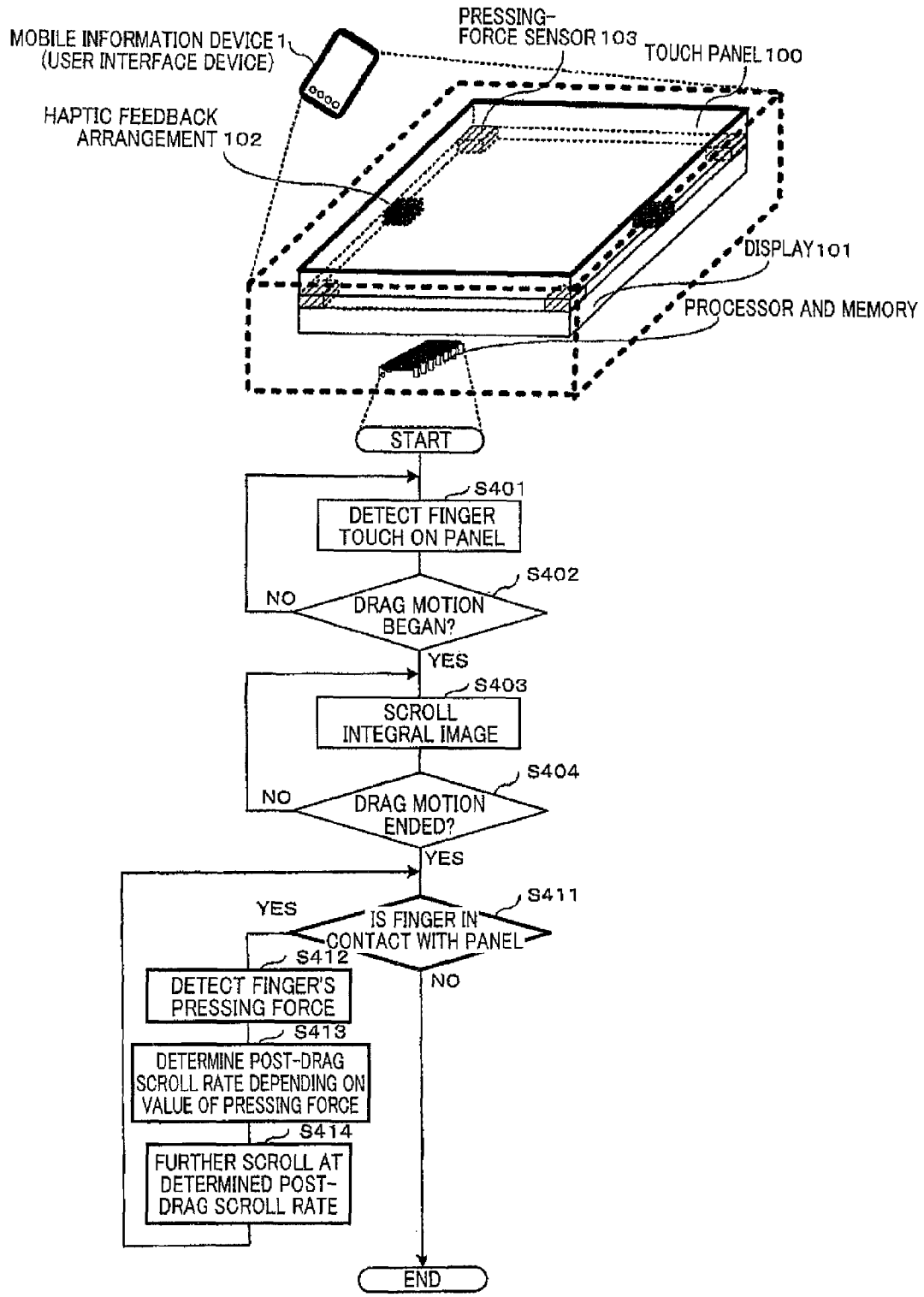
FIG. 4 is a perspective view schematically illustrating the construction of the mobile information device depicted in FIG. 1, together with a flowchart schematically illustrating an implementing example of an image-scrolling method of the mobile information device.
Figure 5:
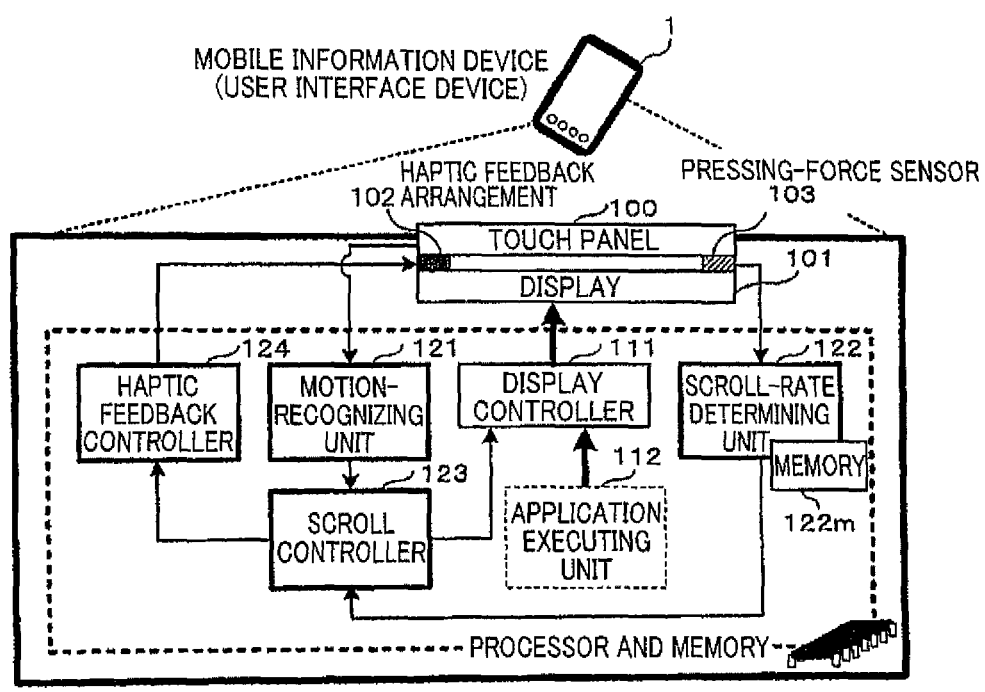
FIG. 5 is a functional block diagram illustrating an implementing example of the mobile information device depicted in FIG. 4.

FIG. 4 is a perspective view schematically illustrating the construction of the mobile information device 1, together with a flowchart schematically illustrating an implementing example of an image-scrolling method of the mobile information device 1. In addition, FIG. 5 is a functional block diagram illustrating an implementing example of the mobile information device 1.

As illustrated in FIG. 4, the mobile information device 1 is constructed to include the touch panel 100, the display 101, the haptic feedback arrangement 102, a pressing-force sensor 103, and a processor and memory. The processor and memory executes a program for performing the image-scrolling method, to thereby provide the function of the program.

For the processor and memory, as well known, a processor and a memory together constitute a computer. The memory among them stores the program for performing the image-scrolling method. The memory is an example of a computer-readable and non-transitory storage medium having stored therein the program. A part of the memory is denoted by "122m," the functions of which will be elaborated below.

The display 101 is configured to display an image on a display screen. In addition, the touch panel 100 is disposed over the display screen of the display 101, and is configured to sense and output successive locations of the user's finger contact point on the display screen over time. The touch panel 100 may be in the form of a projected capacitive touch panel, a surface capacitive touch panel, a resistive touch panel, an ultra-sonic surface acoustic wave touch panel, an infra-red touch panel, or the like.

The haptic feedback arrangement 102 is configured to vibrate the touch panel 100, to thereby impart to the user's finger held in contact with the touch panel 100, haptic feedback as a response to the user's particular motions. An example of the haptic feedback arrangement 102 operates in response to the user's finger-press motion on the touch panel 100 subsequently to a drag motion, to impart to the finger vibrations $v_1$ (see FIGS. 1(C1) and 1(C2)) with an intensity level changing as a function of the level of a scroll rate controlled depending on the magnitude of the pressing force $p_C$. The haptic feedback arrangement 102 may be, for example, in the form of a piezoelectric actuator formed with piezoelectric materials such as PZT (Lead Zirconate Titanate).

The pressing-force sensor 103 is used to detect a pressing force $p_C$ with which the user presses the touch panel 100 with the finger. In an example, the pressing-force sensor 103 is disposed at each of four corners of the touch panel 100, and the pressing force $p_C$ is measured by averaging four component forces with which the pressing-force sensors 103 are pressed at the four corners, respectively, by deflection created in the touch panel 100 with the pressing finger. The pressing-force sensor 103(s) outputs a pressing-force signal indicative of the detected pressing force $p_C$, which enters a scroll-rate determining unit 122 described below.

In an example, the pressing-force sensor 103 may be in the form of a piezoelectric sensor formed with piezoelectric materials such as PZT. In another example, the pressing-force sensor 103 can be used to serve as a haptic feedback arrangement, instead of or in addition to the haptic feedback arrangement 102 formed with a piezoelectric actuator.

The pressing force $p_C$ with which the user presses a touch screen of the touch panel 100 is an example of a physical quantity expressing the intensity of a finger touch on the touch screen. The intensity of a finger touch can be expressed by, instead of the pressing force $p_C$, the size of an area in which the finger touches the touch screen, a change in electrical property in response to a finger touch on the touch screen, or a change in temperature in response to a finger touch on the touch screen. Therefore, the present embodiment may be practiced in modified modes by replacing the pressing force $p_C$ with an alternative equivalent physical quantity.

The above-mentioned processor and memory is configured to input from the touch panel 100 a contact-location signal indicative of the location of a finger contact point, and input the pressing-force signal from the pressing-force sensor 103, identify the user's finger motions performed during a drag click motion, based on the inputted signals, and scroll an integral image in a manner reflecting the status of the motions. Now, the configuration of the processor and memory will be described with reference to FIG. 5.

As illustrated in FIG. 5, the processor and memory is constructed to incorporate the motion-recognizing unit 121, the scroll-rate determining unit 122, the scroll controller 123, the haptic feedback controller 124, a display controller 111, and an application executing unit 112, in addition to the above-described memory 122m.

The motion-recognizing unit 121 is configured to input the contact-location signal from the touch panel 100, and determine whether or not a finger contact point has moved immediately after the finger touches the touch panel 100, that is, whether or not a drag motion has started, and output the determination result to the scroll controller 123. The motion-recognizing unit 121 is further configured to follow up with determining whether or not the movement of the finger contact point has stopped, that is, whether or not the drag motion has ended, and output the determination result to the scroll controller 123, similarly with the previous determination result.

The scroll-rate determining unit 122 is configured to input the pressing-force signal from the pressing-force sensor 103, and determine the post-drag scroll rate $v_{AD}$ as a function of the pressing force $p_C$ occurring after the drag motion. The scroll-rate determining unit 122 has stored in such as the memory 122m a predetermined relationship between the pressing force $p_C$ and the post-drag scroll rate $v_{AD}$, as illustrated in such as FIG. 2. The scroll-rate determining unit 122 calculates successive values of the post-drag scroll rate $v_{AD}$ as a function of successive values of the pressing force $p_C$ received from the pressing-force sensor 103, and outputs the calculated successive values of the post-drag scroll rate $v_{AD}$ to the scroll controller 123.

Upon reception of the determination that a drag motion has started, from the motion-recognizing unit 121, the scroll controller 123 instructs the display controller 111 to scroll an integral image. Additionally, the scroll controller 123 determines the direction and the distance for scrolling, based on the direction and the distance of the movement of the finger contact point occurring during the drag motion, both of which were inputted from the motion-recognizing unit 121, and instructs the display controller 111 accordingly.

Still additionally, upon reception of the determination that the drag motion has ended, from the motion-recognizing unit 121, the scroll controller 123 instructs the display controller 111 to further scroll the integral image at the post-drag scroll rate $v_{AD}$ delivered from the scroll-rate determining unit 122. In this regard, the follow-up scrolling (i.e., subsequent scrolling) has preferably the same direction as that of scrolling invoked by the drag motion.

The haptic feedback controller 124 inputs from the scroll controller 123, instruction information of instructions for the follow-up scrolling, and controls the haptic feedback arrangement 102 to impart a haptic feedback (e.g., vibrations v (see FIGS. 1(C1) and 1(C2))) changing as a function of the scroll rate. During this phase, for example, in case the pressing force rapidly rises from $p_{C1}$ to $p_{C2}$, the correspondingly-determined post-drag scroll rate (i.e., a target scroll rate) also rapidly changes from $v_{AD1}$ to $v_{AD2}$.

However, as for an actual scroll rate, the change from $v_{AD1}$ to $v_{AD2}$ may be made not stepwise but continuously and smoothly. In that case, the haptic feedback controller 124 may change the intensity of the haptic feedback (i.e., the vibrations v) in coordination with the smooth changes in the actual scroll rate.

The display controller 111 is configured to input application execution information from the application executing unit 112, and command the display 101 to display on the display screen an image associated with the application being executed. In addition, the display controller 111 is configured to input from the scroll controller 123 instruction information of instructions for scrolling the integral image, and command the display 101 to display the integral image so as to be scrolled under the instructed conditions.

Referring next to a flowchart depicted in FIG. 4, an implementing example of the image-scrolling method to be executed by the processor and memory will be described.

As illustrated in FIG. 4, as a first step, the touch panel 100 operates to detect a finger touch on the screen (step S401). Next, the motion-recognizing unit 121 determines whether or not a drag motion has started (step S402). If it has been determined that a drag motion has started, then the scroll controller 123 performs scrolling to scroll the integral image in sync with the status of the current drag motion (step S403).

Thereafter, the motion-recognizing unit 121 determines whether or not the drag motion has ended (step S404). If it has been determined that the drag motion has not ended, then the scrolling continues (step S403).

If, however, it has been determined that the drag motion has ended, then the motion-recognizing unit 121 follows up with determining whether or not the finger is in touch with the touch panel 100 (step S411). If it has been determined that the finger is not in touch with the touch panel 100 (i.e., the finger has released from the touch panel 100), then, because there is no drag click motion, the current cycle of execution of this image-scrolling method is terminated without performing any follow-up scrolling.

If, however, it has been determined that the finger is in touch with the touch panel 100, then the pressing-force sensor 103 detects the finger's pressing force $p_C$ (step S412). If the detected pressing-force $p_C$ is equal to or larger than the predetermined threshold $p_{TH0}$ (see FIG. 2), then a drag click motion is recognized or identified. It is noted that the pressing-force sensor 103 may always monitor the pressing force $p_C$.

Subsequently, the scroll-rate determining unit 122 determines the post-drag scroll rate $v_{AD}$ as a function of the magnitude of the pressing force $p_C$ occurring after the drag motion (step S413). Following that, the scroll controller 123 causes the integral image to be scrolled at the determined post-drag scroll rate $v_{AD}$ (step S414). It is noted that the above-described steps from S412 to S414 are repeated until it is determined that the finger is no longer in touch with the touch panel 100 in step S411.

As will be readily understood from the foregoing explanation, according to the user interface device, the image-scrolling method and the program, each of which is constructed according to the present embodiment, after a drag motion ends, an integral image is further scrolled at the post-drag scroll rate $v_{AD}$ determined depending on the magnitude of the finger's pressing force $p_C$. Owing to this, when a user handles full information that is too large in size to be entirely displayed on the screen, an out-of-view and distant-from-screen region of the full information can come into view in a shortened period of time with a simplified motion.

Next, a mobile information device 1 according to an illustrative second embodiment of the present invention will be described. The present embodiment, however, has elements common with those in the first embodiment; therefore, a redundant description of the elements common with those of the first embodiment will be omitted by referencing the same names or the same numerical references, and the present embodiment will be described in detail with regard to only different elements from those of the first embodiment.

In the first embodiment, as described above, a drag motion invokes scrolling of an image, and after the drag motion ends, if a user's finger is held in touch with a touch screen at substantially the same location as where the finger was located when the drag motion ended, without releasing from the touch screen, the image is further scrolled to perform follow-up or subsequent scrolling, after experiencing an idle period or not. Additionally, a scroll rate of the follow-up scrolling is controlled, depending on the intensity of the finger's touch on the touch screen, such that the scroll rate increases continuously or stepwise, as the intensity of the finger's touch increases.

In the first embodiment, it follows that, as will be evident from the two graphs depicted in FIG. 3, if the user relaxes a pressing force in the course of scrolling performed after the drag motion ends, then the scroll rate decreases accordingly. For that reason, in case the user does not need to increase the scroll rate, but needs to hold the scroll rate, the user is required to keep pressing the finger on the screen with the same magnitude of a force.

In contrast, in the present embodiment, for improving ease of use of the mobile information device 1, the scroll rate of the follow-up scrolling is controlled such that the scroll rate does not decrease even when the intensity of the finger's touch decreases. More specifically, successive values of a pressing force with which the finger presses the touch screen are detected during a period of time subsequent to an end time of the drag motion and optionally at the end time of the drag motion, and the scroll rate of the follow-up scrolling at each point in time is determined based on a maximum value among the detected values of the pressing force obtained until each point in time, wherein the pressing force is an example expression of the intensity of a finger touch.

An example will be considered in which, immediately after a drag motion ends, the user presses the finger onto the touch panel 100 with a pressing force $p_C$ ($p_{MAX}$), and then the user relaxes the pressing. In this case, the scroll rate of the scrolling increases to a post-drag scroll rate determined depending on the pressing force $p_C$ ($p_{MAX}$), and then, the scroll rate is held at this rate.

Also in the present embodiment, as illustrated in FIG. 2, a variety of variations of the post-drag scroll rate $v_{AD}$ that is a function of the pressing force can be taken. However, the magnitude of a pressing force to be referenced for determining the post-drag scroll rate $v_{AD}$ at each point in time is a maximum value among values of the pressing force which had been detected during a period from the end time of the drag motion to each point in time.

Figure 6:
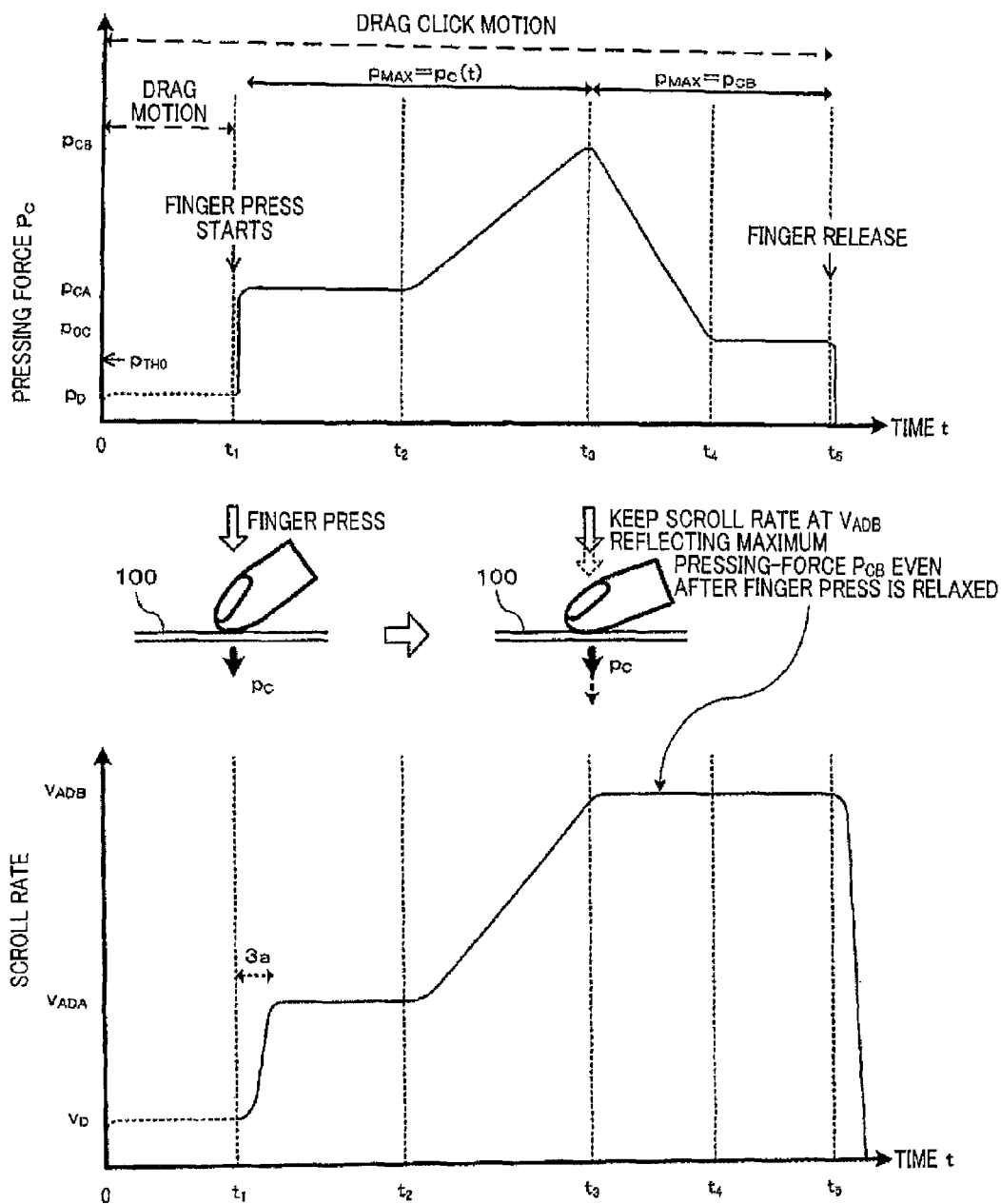
FIG. 6 illustrates a graph showing an example of a time history of a pressing force $p_C$ applied by a user's finger during a drag click motion, on a mobile information device incorporating a user interface device according to a second illustrative embodiment of the invention, and a graph showing an example of a time history of a scroll rate changing as a function of the pressing force $p_C$.

FIG. 6 illustrates a graph showing an example of a time history of a pressing force $p_C$ applied by a user's finger during a drag click motion, and a graph showing an example of a time history of a scroll rate changing as a function of the pressing force $p_C$, similarly with FIG. 3. Also in an example depicted in FIG. 6, it was assumed that the pressing force $p_C$ and the post-drag scroll rate $v_{AD}$ were governed by the relationship 2b depicted in FIG. 2 (i.e., a directly proportional relationship).

In the example depicted in FIG. 6, a drag motion was performed during a period from t=0 to t=$t_1$. A scroll rate during that period reflected the finger's moving velocity, which was $v_D$. Thereafter, a finger press onto the touch panel 100 started at the same time that the drag motion ended (i.e., t=$t_1$), resulting in the pressing force $p_C$ increasing to $p_{CA}$. The maximum value $p_{MAX}$ of the pressing force during this period was a value $p_C(t)$ of the pressing force occurring at each point in time. Depending the maximum value $p_{MAX}$ of the pressing force, the scroll rate increased to the post-drag scroll rate $v_{ADA}$ (>$v_D$).

Subsequently, the pressing force $p_C$ was kept unchanged until t=$t_2$, which was followed by the user's additional finger-press motion with a greater force than before, in an attempt to move into view a region of full information that was being focused on, wherein the region was still located distant from the screen and was still out of view even after the scrolling (i.e., preceding scrolling and subsequent scrolling) was performed. As a result, the finger's pressing force $p_C$ kept increasing, during a period from t=$t_2$ to t=$t_3$, resulting in a transition from $p_{CA}$ to $p_{CB}$ (>$p_{CA}$).

Also during this period, the maximum value $p_{MAX}$ of the pressing force became equal to a value $p_C(t)$ of the pressing force occurring at each point in time. It follows that consecutive values of the post-drag scroll rate $v_{AD}$ were determined successively over time during this period allowing the maximum value $p_{MAX}$ of the pressing force to change were increased one after another on a time line, resulting in an increase from $v_{ADA}$ to $v_{ADB}$ (>$v_{ADA}$). As a result, the scroll rate was held at the post-drag scroll rate $v_{ADA}$ at least until t=$t_2$, subsequently increased, and after t=$t_3$, reached the post-drag scroll rate $v_{ADB}$.

Thereafter, the user recognized that a desired value of the scroll rate was reached, and subsequently, the user gradually relaxed a finger-press motion. As a result, the pressing force $p_C$ dropped to $p_{CC}$ at t=$t_4$. During this period, the maximum value $p_{MAX}$ of the pressing force was held constant at a peak value (i.e., a maximum value) $p_{CB}$. Depending on this stable maximum value $p_{MAX}$ of the pressing force, the post-drag scroll rate $v_{AD}$ was held constant at a value corresponding to the maximum value $p_{MAX}$, and as a result, the scroll rate was also held at the post-drag scroll rate $v_{AD}$.

It is noted that, in case a value of the pressing force $P_c$ obtained at each point in time (i.e., the newest value) depicted in FIG. 6 is larger than the newest one of the maximum values $p_{MAX}$ of the pressing force, the maximum value $p_{MAX}$ of the pressing force that has been retained in the memory 122$m$ will be updated to reflect the newest value of the pressing force $P_c$. On the basis of the updated maximum value $p_{MAX}$ of the pressing force, the newest value of the post-drag scroll rate $v_{AD}$ is determined. Only if a new measurement of the pressing force $p_C$ which is larger than the retained maximum value $p_{MAX}$ of the pressing force is obtained, the retained maximum value $p_{MAX}$ will be updated to reflect the new larger measurement. As a result, the value retained in the memory 122$m$ always indicates a maximum one of values of the pressing force $p_C$ which had been obtained since the end time of the drag motion until each point in time.

Thereafter, the user found a desired region of the full information within the screen in a state of $p_C=p_{CC}$, and subsequently, the user released the finger from the touch panel 100 at $t=t_5$. In response, the scroll rate was also kept at the post-drag scroll rate $v_{ADC}$ at least until $t=t_5$, and eventually became zero (the scrolling was completed). In other words, in response to termination of the finger touch, the post-drag scroll rate $v_{AD}$ is set to zero.

Figure 7:
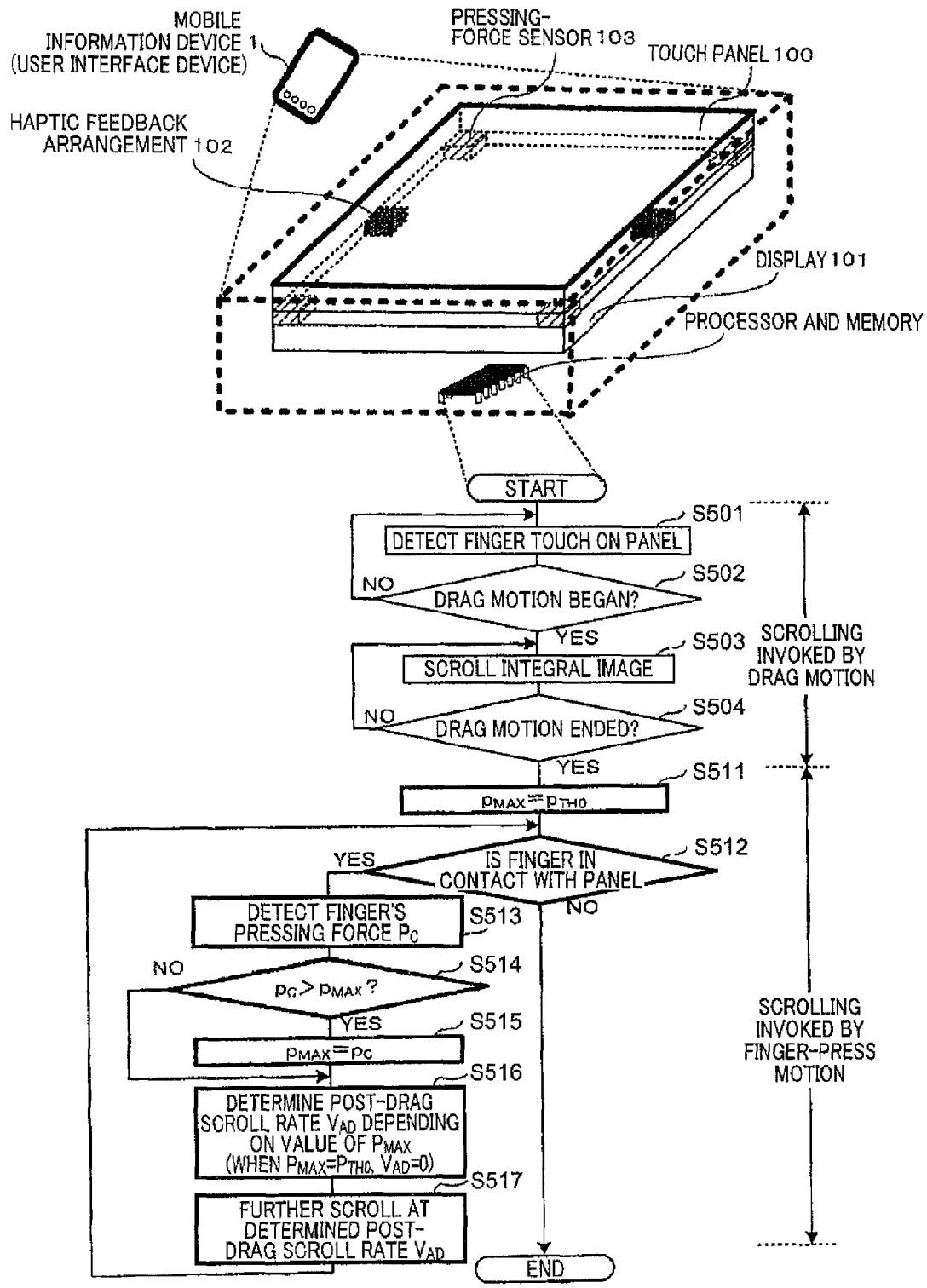
FIG. 7 is a perspective view schematically illustrating the construction of the mobile information device according to the second illustrative embodiment, together with a flowchart schematically illustrating an implementing example of an image-scrolling method of the mobile information device.

FIG. 7 is a perspective view schematically illustrative of the configuration of the mobile information device 1 according to the present embodiment, together with a flowchart schematically illustrating an implementing example of an image-scrolling method of the mobile information device 1.

As illustrated in FIG. 7, like the first embodiment, the mobile information device 1 is constructed to include the touch panel 100, the display 101, the haptic feedback arrangement 102, the pressing-force sensor 103, and the processor and memory.

Like the first embodiment illustrated in FIG. 5, the processor and memory is constructed to incorporate the motion-recognizing unit 121, the scroll-rate determining unit 122, the scroll controller 123, the haptic feedback controller 124, the display controller 111, the application executing unit 112, and the memory 122$m$. These elements are similar with those of the first embodiment, except for the scroll-rate determining unit 122, and therefore, only the scroll-rate determining unit 122 will be described in more detail, while a redundant explanation will be omitted.

The scroll-rate determining unit 122 is configured to input the pressing-force signal from the pressing-force sensor 103, and determine the post-drag scroll rate $v_{AD}$ as a function of the maximum one $p_{MAX}$ of successive values of the pressing force $p_C$ occurring after a drag motion ends.

More specifically, the scroll-rate determining unit 122 retains in the memory 122$m$, at each point in time, the maximum one $p_{MAX}$ of successive values of the pressing force $p_C$ occurring after a drag motion ends, and determines or sets, at each point in time, the post-drag scroll rate $v_{AD}$ to a value varying as a function of the maximum value $p_{MAX}$ of the pressing force $p_C$. In addition, if a new measurement of the pressing force $p_C$ which is larger than the retained maximum value $p_{MAX}$ is obtained, the scroll-rate determining unit 122 updates the retained value (i.e., the maximum value $p_{MAX}$) into the measurement of the pressing force $p_C$.

Additionally, the scroll-rate determining unit 122 retains in the memory 122$m$, a predetermined relationship between the maximum value $p_{MAX}$ of the pressing force $p_C$ and the post-drag scroll rate $v_{AD}$, like the relationships illustrated in FIG. 2. According to the retained relationship, the scroll-rate determining unit 122 successively determines the post-drag scroll rate $v_{AD}$ to reflect a maximum one of the measurements of the pressing force $p_C$ which have been received from the pressing-force sensor 103 (i.e., the retained maximum value $p_{MAX}$ of the pressing force $p_C$), and delivers the successive values of the post-drag scroll rate $v_{AD}$ to the scroll controller 123.

Referring next to a flowchart depicted in FIG. 7, an implementing example of the image-scrolling method to be executed by the processor and memory will be described.

(S501) First, the touch panel 100 detects a finger touch.
(S502) Next, the motion-recognizing unit 121 determines whether or not a drag motion has started.
(S503) If it is determined in step S502 that a drag motion has started, then the scroll controller 123 causes an integral image to be scrolled in coordination with the status of the drag motion. If, however, it is determined that no drag motion has started, then the touch detection process is repeated (step S501).
(S504) Next, the motion-recognizing unit 121 determines whether or not the drag motion has ended. If it is determined that the drag motion has not ended, then the scrolling continues (step S503).
(S511) If, however, it is determined that the drag motion has ended, then a transition is made from the scrolling invoked by a drag motion to a preparation phase for scrolling invoked by a press motion. In this case, a parameter $p_{MAX}$ is initially set to a predetermined threshold $p_{TH0}$ ($p_{MAX}=p_{TH0}$).
(S512) The motion-recognizing unit 121 further determines whether or not the finger is in touch with the touch panel 100. If it is determined that the finger is not in touch with the touch panel 100 (i.e., the finger has released from the touch panel 100), then the scrolling terminates, with the judgment that no drag click motion has been performed.
(S513) If, however, it is determined that the finger is in touch with the touch panel 100, then the pressing-force sensor 103 measures a pressing force $p_C$ applied by the finger.
(S514) A determination is made as to whether or not the measurement of the pressing force $p_C$ is larger than the parameter $p_{MAX}$.
(S515) If it is determined that the measurement of the pressing force $p_C$ is larger than the parameter $p_{MAX}$ ($p_C > p_{MAX}$), then the value of the parameter $p_{MAX}$ is updated to reflect the measurement of the pressing force $p_C$. If, however, $p_C \leq p_{MAX}$ is determined, then the process proceeds directly to step S516.
(S516) The scroll-rate determining unit 122 determines the post-drag scroll rate $v_{AD}$ as a function of the value of the parameter $p_{MAX}$ (i.e., the maximum value $p_{MAX}$ of the pressing force occurring after the drag motion ends). It is also preferable that the post-drag scroll rate $v_{AD}$ is set to zero when $p_{MAX}=p_{TH0}$.
(S517) Subsequently, the scroll controller 123 causes the integral image to be scrolled at the determined post-drag scroll rate $v_{AD}$. In this process, the above-described steps S512 through S517 are repeated while step S512 keeps determining that the finger is in touch with the touch panel 100.

As will be evident from the foregoing explanation, the present embodiment allows the user to adjust the scroll rate while the user is performing a finger-press motion after a drag motion ends, by altering a maximum value of the finger's pressing force $p_C$. It follows that the user is not required to keep pressing the finger with a considerably large force, for continued scrolling at a suitable scroll rate. As a result, the user can perform scrolling with eased complexity of the required motion.

More specifically, in the present embodiment, if a current measurement of the pressing force becomes larger than a previous measurement, then a current value of the post-drag scroll rate $v_{AD}$ is determined so as to fit the current measurement of the pressing force, according to a pre-selected one of the relationships depicted in FIG. 2, and if, however, the current measurement of the pressing force is equal to or becomes smaller than the previous measurement, then the current value of the post-drag scroll rate $v_{AD}$ is held at the previous value, without referencing any one of the relationships. As a result, after the follow-up or subsequent scrolling has started, even if the finger press is relaxed, the scroll rate is held at a value of the post-drag scroll rate, which was taken just before the finger press was relaxed.

Therefore, according to the present embodiment, once a scroll rate has been determined depending on the finger's pressing force and scrolling has started at the determined scroll rate, even if the finger press is subsequently relaxed, the scrolling continues at the same scroll rate that was determined before the finger press was relaxed. This averts the finger from being fatigued, and the complexity of the required motion for scrolling is eased.

While some of embodiments of the present invention have been described above in detail with reference to the drawings, they are just examples, and the present invention may be embodied in alternative modes, which begin with the modes described in the section titled "Summary of the Invention," or which are obtained by making various modifications and improvements to the above-described embodiments, in view of the knowledge of those skilled in the art.

The invention claimed is:

1. A user interface device operable to perform a display function of displaying an image, a touch panel function of outputting successive locations of the user's finger contact point on a touch screen over time, and a function of scrolling an integral image being displayed, in response to a drag motion performed on the touch screen with the user's finger, the user interface device comprising:
   a pressing-force sensor detecting a pressing force with which the finger presses the touch screen;
   a motion-recognizing unit configured to determine whether or not the drag motion has ended;
   a scroll-rate determining unit configured to be operable in response to the motion-recognizing unit determining that the drag motion has ended, to determine a post-drag scroll rate that is a scroll rate of scrolling to be performed subsequently to the drag motion, based on a magnitude of the pressing force detected by the pressing-force sensor at an end time of the drag motion and/or during a period of time after the end time of the drag motion; and
   a scroll controller configured to further scroll the integral image being displayed, at the determined post-drag scroll rate, after scrolling invoked by the drag motion ends.

2. The user interface device according to claim 1, wherein the scroll controller is configured to be operable in response to the user pressing the finger onto the touch screen just after the drag motion, to raise a scroll rate of the scrolling to be performed by the scroll controller up to the determined post-drag scroll rate.

3. The user interface device according to claim 1, further comprising:
   a haptic feedback arrangement configured to impart haptic feedback to the user's finger in contact with the touch screen; and
   a haptic feedback controller configured to control the haptic feedback arrangement to impart to the finger via the touch screen, the haptic feedback with an intensity changing as a function of a scroll rate of the scrolling to be performed by the scroll controller.

4. The user interface device according to claim 3, wherein the haptic feedback controller is configured to control the haptic feedback arrangement to impart to the finger vibrations with intensities that become higher as the scroll rate of the scrolling becomes higher.

5. The user interface device according to claim 1, wherein the motion-recognizing unit is configured to be operable in response to the motion-recognizing unit determining that the drag motion has ended, to determine whether or not the finger is in touch with the touch screen, and
   the scroll controller is configured to be operable in response to the motion-recognizing unit determining that the finger is in touch with the touch screen, to further scroll the integral image at the determined post-drag scroll rate.

6. The user interface device according to claim 1, the scroll-rate determining unit is configured to determine the post-drag scroll rate to be zero, when the pressing force is below a predetermined threshold.

7. The user interface device according to claim 1, wherein the scroll controller is configured to retain information indicative of a direction of scrolling that was invoked by the drag motion, and further scroll the integral image in a same direction as that of the scrolling invoked by the drag motion, subsequently to the drag motion.

8. The user interface device according to claim 1, wherein the scroll-rate determining unit is configured to detect successive values of the pressing force via the pressing-force sensor, during the period of time subsequent to the end time of the drag motion and optionally at the end time of the drag motion, and determine the post-drag scroll rate at each point in time, based on a maximum value among the detected values of the pressing force obtained until each point in time.

9. The user interface device according to claim 8, wherein the motion-recognizing unit is configured to successively determine whether or not the finger is in touch with the touch screen after the drag motion ends, and
   the scroll-rate determining unit is configured to determine the post-drag scroll rate to be zero regardless of the maximum value of the pressing force, when the motion-recognizing unit determines that the finger is not in touch with the touch screen.

10. The user interface device according to claim 8, wherein the scroll-rate determining unit is configured to be operable in response to an event occurring in which the pressing force changes over time such that the pressing force increases to a first value just after the drag motion ends, and then the pressing force decreases to a second value, to control the scroll rate of the scrolling to exhibit a characteristic that the scroll rate increases to a value of the post-drag scroll rate which is determined depending on the first value, and then the scroll rate is kept unchanged.

11. A method of scrolling an image on a user interface device operable to perform a display function of displaying an image, a touch panel function of outputting successive locations of the user's finger contact point on a touch screen over time, and a function of scrolling an integral image being displayed, in response to a drag motion performed on the touch screen with the user's finger,
wherein the user interface device comprises a pressing-force sensor detecting a pressing force with which the finger presses the touch screen,
the method comprising:
a first step of determining whether or not the drag motion has ended;
a second step of determining, in response to the motion-recognizing unit determining that the drag motion has ended, a post-drag scroll rate that is a scroll rate of scrolling to be performed subsequently to the drag motion, based on a magnitude of the pressing force detected by the pressing-force sensor at an end time of the drag motion and/or during a period of time subsequent to the end time of the drag motion; and
a third step of further scrolling the integral image being displayed, at the determined post-drag scroll rate, after scrolling invoked by the drag motion ends.

12. The method according to claim 11, wherein the second step is implemented to detect successive values of the pressing force via the pressing-force sensor, during the period subsequent to the end time of the drag motion and optionally at the end time of the drag motion, and determine the post-drag scroll rate at each point in time, based on a maximum value among the detected values of the pressing force obtained until each point in time.

13. A non-transitory computer-readable storage medium that has stored therein a program, when executed by a computer, to perform the method according to claim 11.

14. A process of scrolling an image on a user interface device configured to display the image on a display screen and enable a user to input with the user's finger touch on a touch screen in association with the displayed image, the process comprising:
a first step of scrolling the image in response to the finger's drag motion on the touch screen with the finger in touch with the touch screen, to thereby perform the scrolling; and
a second step of further scrolling the image, in response to an event occurring in which, after the scrolling ends, the finger is held in touch with the touch screen at substantially the same location as where the finger was located when the drag motion ended, without releasing from the touch screen, to thereby perform subsequent scrolling, after experiencing an idle period or not,
wherein the second step is implemented to control a scroll rate of the subsequent scrolling, depending on an intensity of the finger's touch on the touch screen, such that the scroll rate increases continuously or stepwise, as the intensity of the finger's touch increases.

15. The process according to claim 14, wherein the second step is implemented to control the scroll rate of the subsequent scrolling, such that the scroll rate does not decrease even when the intensity of the finger's touch decreases.

16. A non-transitory computer-readable storage medium that has stored therein a program, when executed by a computer, to perform the process according to claim 14.

* * * * *